United States Patent [19]

Sai et al.

[11] Patent Number: 5,351,605
[45] Date of Patent: Oct. 4, 1994

[54] AUTOMATIC NOODLE COOKER

[76] Inventors: Keishu Sai, 3-160, Hongo-cho, Naka-ku, Yokohama 231, Kanagawa-ken, Japan; Tetsuya Hayashibara, 1-6-8, Kugahara, Ohta-ku, Tokyo 146, Japan

[21] Appl. No.: 937,391

[22] Filed: Aug. 31, 1992

[51] Int. Cl.$^5$ .............................................. A23L 1/00
[52] U.S. Cl. ...................................... 99/330; 99/357; 99/407; 392/471; 392/492
[58] Field of Search ........................ 99/330, 357, 407; 392/471, 485, 486, 487, 491, 492

[56] References Cited

U.S. PATENT DOCUMENTS

| | | | |
|---|---|---|---|
| 1,766,068 | 6/1930 | De Lannoy | 392/487 |
| 3,586,822 | 6/1971 | Pastorie | 392/492 |
| 3,885,125 | 5/1975 | Palm | 392/487 |
| 4,489,646 | 12/1984 | Schmidt | 99/407 |
| 4,604,515 | 8/1986 | Davidson | 392/492 |
| 4,823,767 | 4/1989 | Wijst | 392/491 |
| 4,869,160 | 9/1989 | Ratolongo | 99/330 |
| 5,070,774 | 12/1991 | Rosso | 99/407 |

*Primary Examiner*—Timothy F. Simone
*Assistant Examiner*—Terrance R. Till
*Attorney, Agent, or Firm*—Sandler, Greenblum & Bernstein

[57] ABSTRACT

An automatic noodle cooker which continuously and automatically supplies hot water while cooking long thin ingredients such as spaghetti. The noodle cooker comprises a hot-water boiler which is divided into several water storage spaces, for example four, and which allows the supplied water to flow from space to space, and where each storage space is equipped with its own heater. The water supplied to the first storage space is heated by the heater and then moves to the next storage space. The hot water is finally supplied from the last storage space through a hot-water supply pipe to a processing section where the ingredients are processed. If new water is supplied to the first storage space equal to the amount of water which was supplied from the last storage space, the temperature of the hot water in the last storage space does not drop very much due to the fact that there are several storage spaces. Therefore, hot water can be continuously and automatically supplied to the processing section from the last storage space at a constant temperature, thus making it possible to improve the processing efficiency of the ingredients. Also, By using a high-pressure pump to supply hot water, the temperature of the hot water can be increased, improving the processing efficiency even more.

8 Claims, 6 Drawing Sheets

AUTOMATIC NOODLE COOKER

BACKGROUND OF THE INVENTION

1. Field of the Invention

This invention relates to an automatic noodle cooker and in more particular to an automatic noodle cooker which cooks long thin food products made of raw noodles.

2. Description of the Prior Art

There are many food products which use noodles as the main ingredient, such as spaghetti, macaroni, udon, soba, and somen, however, to make these food products, after the noodle material has been made into flour, the material is made long and thin according to the specifications of each respective food product, and then these long thin noodles are cooked in hot water to produce the final food product.

Normally, in order to obtain the final food product, a noodle cooker with a hot water boiler is used. FIG. 6 shows an example of the construction of a hot water boiler used in a prior noodle cooker. The hot water boiler 16 comprises a cylindrical container 30 which has a bottom 30A, and at one end of the space 32 is a water supply opening 34 and there is also a heater 33. There is also a hot-water supply pipe 35, hot-water supply valve 36, and cover 17, and hot water flows into the central hollow section 37 of the cylindrical container 30 and is stored. This central hollow section 37 functions as the processing section for cooking the long thin ingredients.

With this kind of construction, the water supplied to the space 32 through the water supply opening 34 is heated by the heater 33 until it is hot, and then this hot water flows through the hot-water supply pipe 35 to the central hollow section 37, with the amount of hot water being regulated by the hot-water supply valve 36. When the aforementioned long thin ingredients to be processed such a as spaghetti are supplied to the central hollow section 37, they are cooked by the hot water. This water is heated by the heater 33 and is 100° C. or lower.

As the amount of hot water flowing to the central hollow section increases, the amount of hot water in the space 32 decreases and this is detected by a liquid-level sensor (not shown in the figure) and so more water is supplied to the hot water boiler 16 through the water supply opening 34. The water is heated by the heater 33 in the same manner as described above and then supplied to the central hollow section 37 together with the long thin ingredients which are to be processed.

In this type of prior noodle cooker, equipped with a hot water boiler, there is a problem that as the hot water in the space decreases, more water is supplied and heating is performed again, however, when water is supplied, the temperature of the hot water lowers and so it takes time for it to be heated. Therefore there is a delay in supplying hot water to the processing section, and the efficiency of processing the long thin ingredients is lowered and interrupts the work.

SUMMARY OF THE INVENTION

The objective of this invention is to provide an automatic noodle cooker which solves this problem and increases the efficiency of processing the ingredients.

In order to accomplish this objective, this invention comprises; a heating section which has several water storage spaces that are divided with partitions so that the supplied water can flow from space to space, and each of these water storage spaces is equipped with its own heater so that when water is supplied to the first water storage space it is heated by the heater and then moves to the next water storage space and the hot water is finally discharged to the outside from the last water storage section, a processing section where the ingredients to be heated are supplied together with the hot water discharged from the heating section, and a control section which automatically controls the flow of hot water from the heating section into the processing section.

DESCRIPTION OF THE PREFERRED EMBODIMENT

According to the construction of claim 1, several water storage spaces are arranged each having its own heater, and water is supplied to the first water storage space and flows to each water storage space. The water is heated by the heater and then moves on to the next water storage space and finally the hot water is discharged from the last water storage space and supplied together with the ingredients to be heated to the processing section.

In so doing, the hot water is reduced and new water is supplied to the first storage space, and since each of the several water storage spaces has its own heater, the temperature of the hot water in the last storage space is not affected much by the new supply of water and does not change, therefore the temperature of the hot water is always maintained. In the processing section, hot water is continuously supplied at a constant temperature and so there is no waiting time and a drop in processing efficiency of the ingredients does not occur.

According to the construction of claim 2, the heating section is constructed using a cylindrical shaped container and so it is possible to make a compact automatic noodle cooker.

According to the construction of claim 3, a high-pressure pump is used to pump the hot water into the processing section and so it is possible to supply hot water that is 100° or hotter, thus the ingredients can be processed in a shorter length of time.

Following, the preferred embodiment of this invention will be described using the drawings as a reference.

Figure 1:
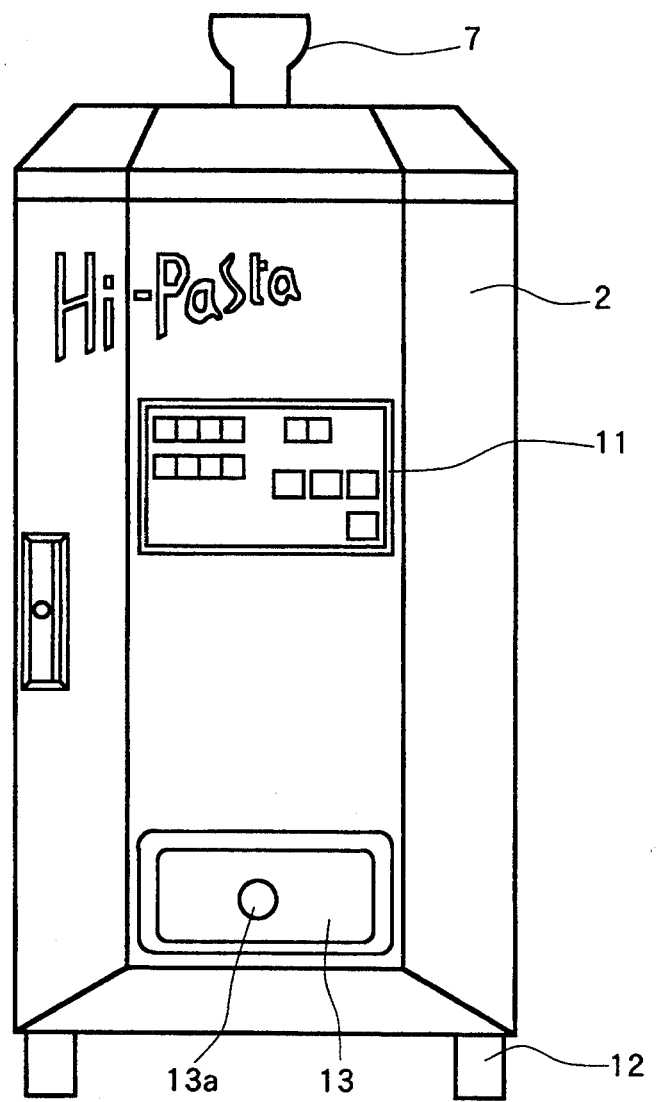
FIG. 1 is a front view showing an embodiment of the automatic noodle cooker of this invention.
Figure 2:
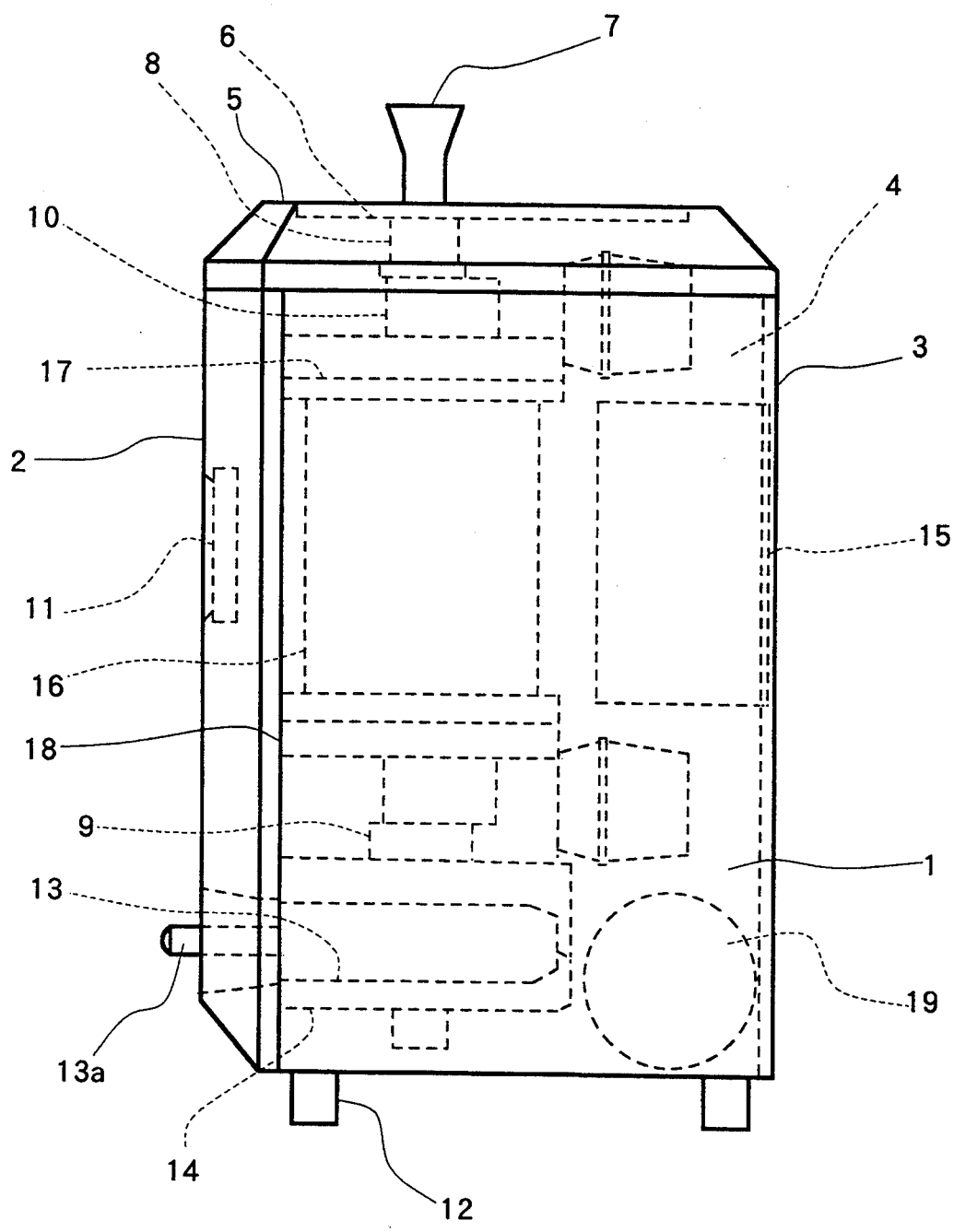
FIG. 2 is a side view showing an embodiment of the automatic noodle cooker of this invention.

FIG. 1 is a front view showing this embodiment of the automatic noodle cooker of this invention, and FIG. 2 is a side view of the same. 1 is the frame, 2 is the front panel, S is the rear panel, 4 is the side panel, 5 is the top plate, 6 is the bottom plate, 7 is the hopper, 8 is the upper flange, 9 is the lower flange, 10 is a motor-operated ball valve, 11 is the control panel, 12 are the legs, 13 is the tray, 13a is the tray drawer, 14 is the noodle receiving section, 15 is the control box, 16 is the hot-water boiler, 17 is the top lid to the boiler, 18 is the bottom lid to the boiler, and 19 is the high-pressure pump.

Figure 3:
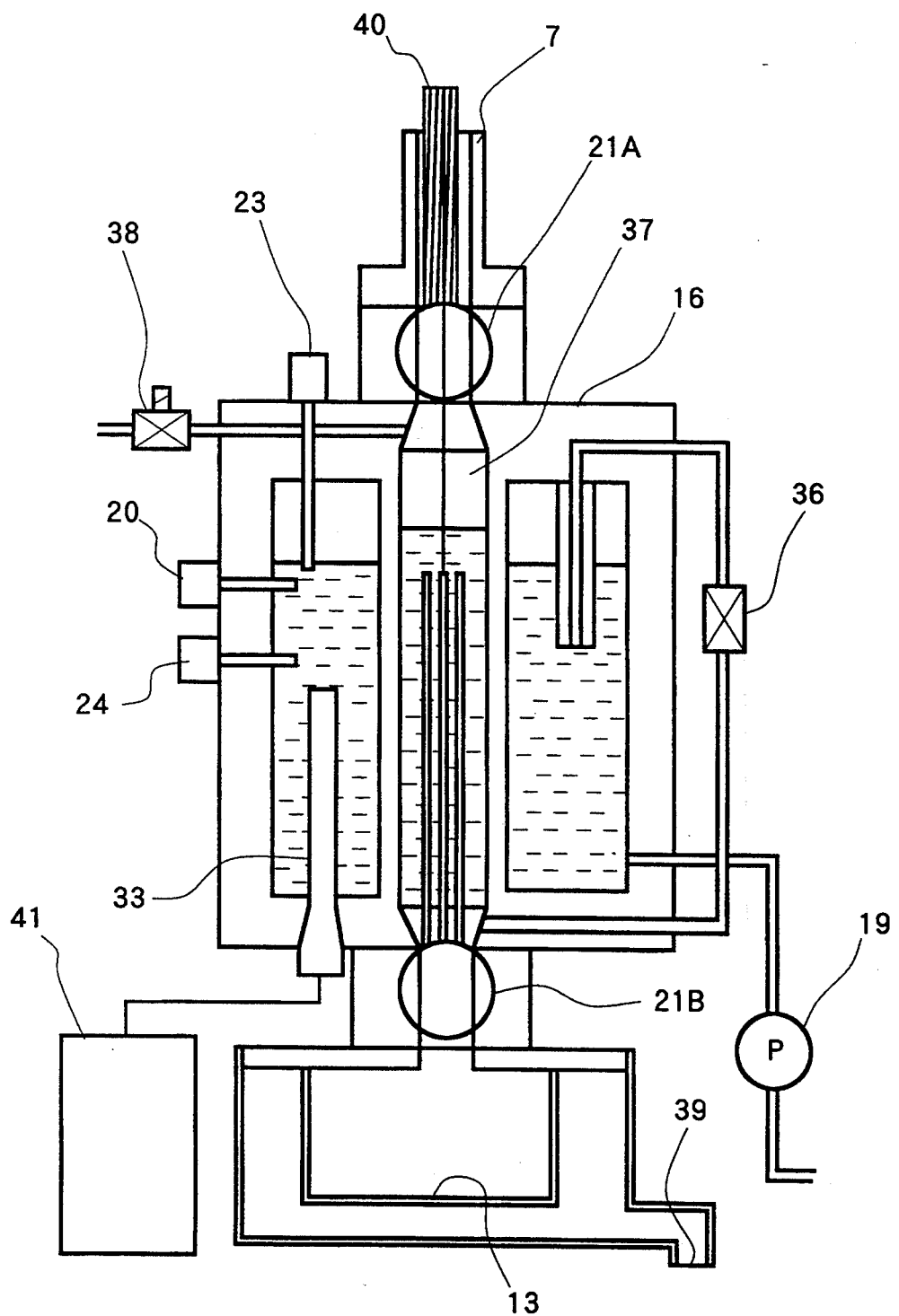
FIG. 3 is an internal construction diagram showing an embodiment of the automatic noodle cooker of this invention.
Figure 4:
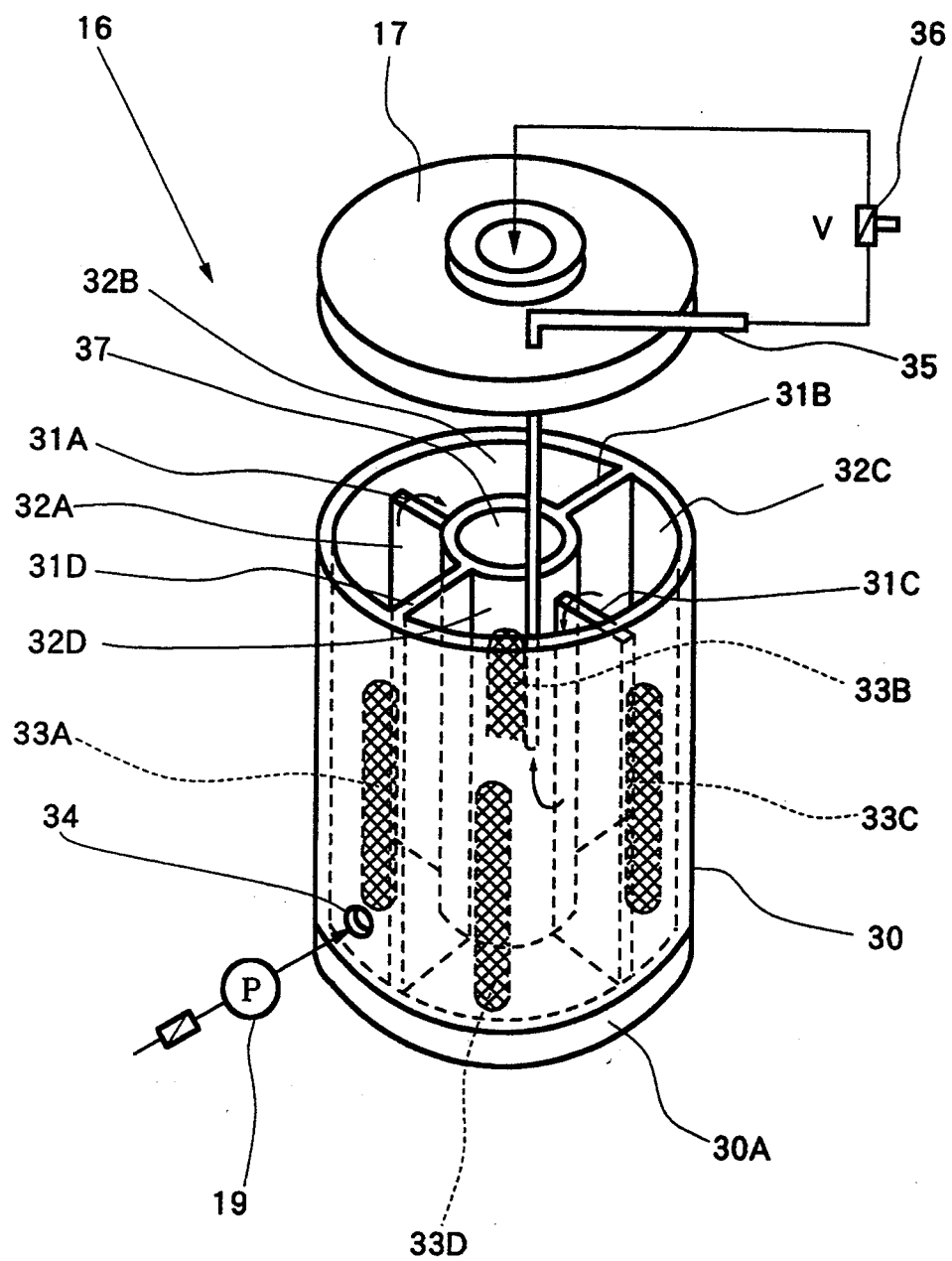
FIG. 4 is an isometric view showing the construction of the hot-water boiler used by this embodiment.
Figure 5:
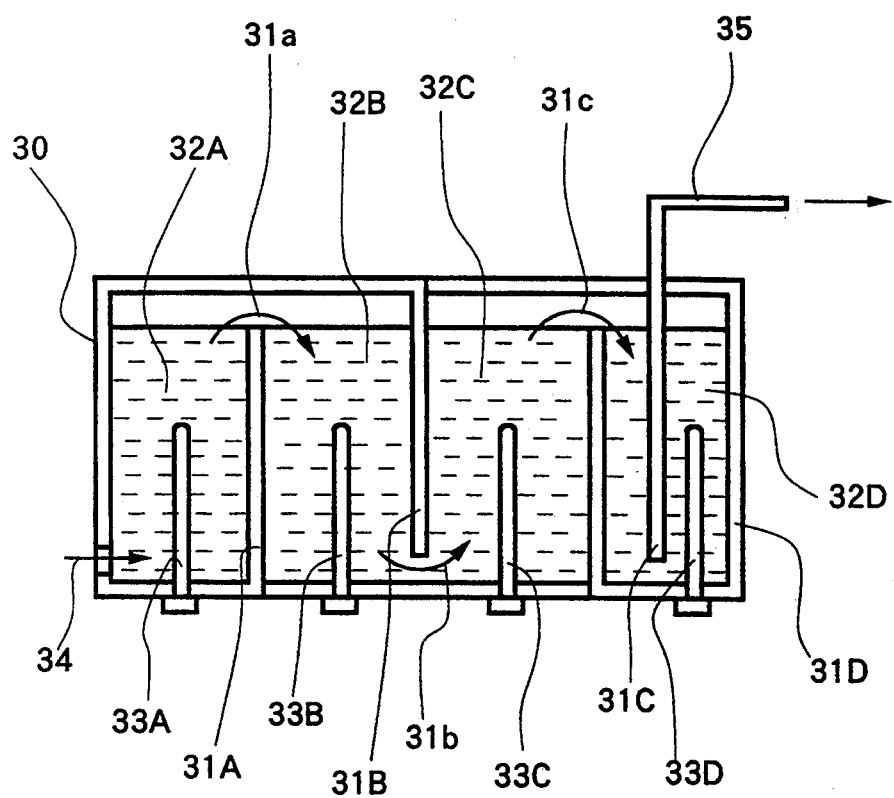
FIG. 5 is an outline drawing explaining the function of the hot-water boiler of FIG. 4.
Figure 6:
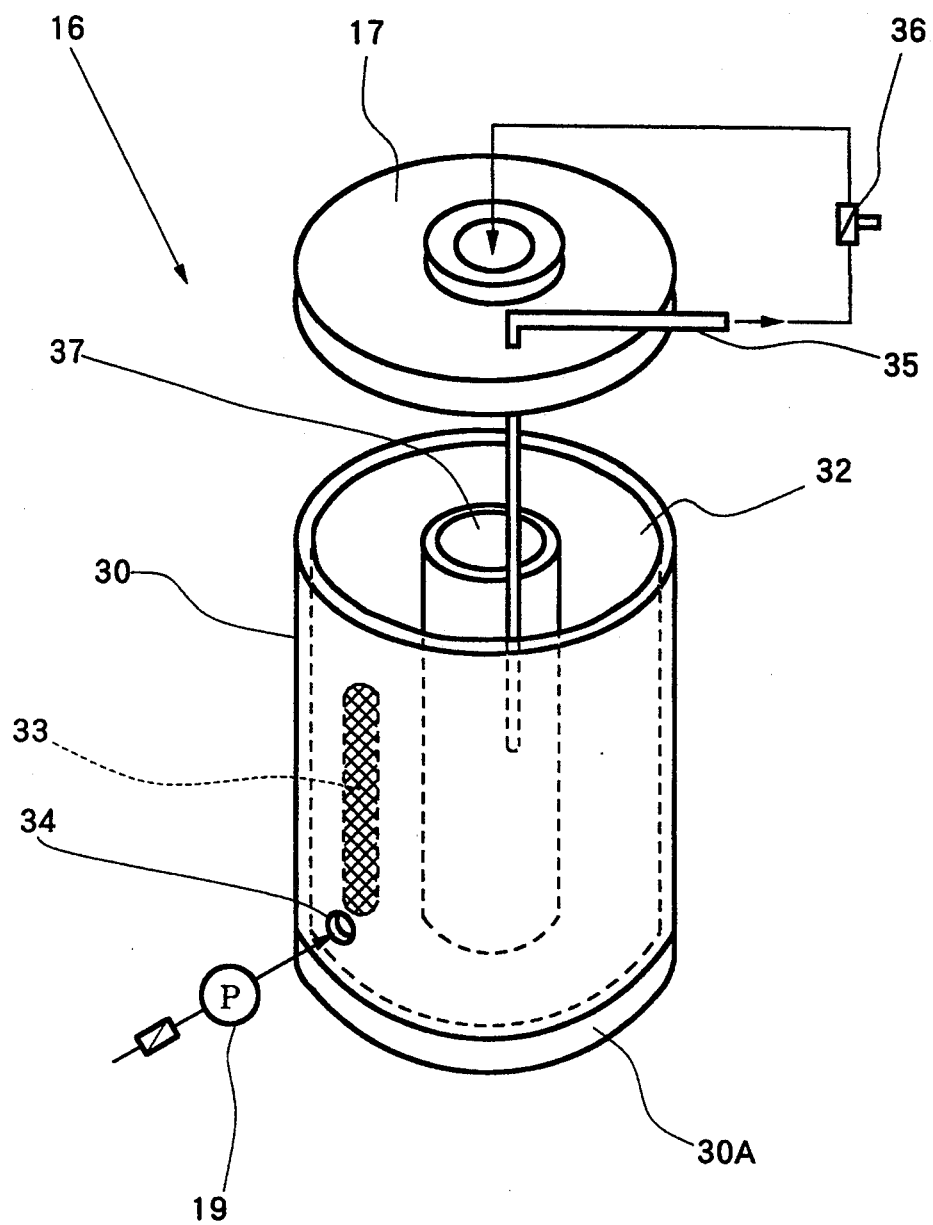
FIG. 6 is an isometric drawing showing the hot-water boiler used in a prior noodle cooker.

FIG. 3 and FIG. 4 show the internal construction of the automatic noodle cooker of this embodiment, and as shown in FIG. 4, the hot-water boiler 16 is comprised of a cylindrical container 30 with a bottom 30A, and this cylindrical container 30 is divided into four water-storage spaces 32A to 32D using partitions 31A to 31D. On the top of the partitions 31A and 31C are notches 31a and 31c, also, on the bottom of the partitions 31B and 31D are notches 31b and 31d, making it possible for water to be mixed well and to move through the storage space. Heaters 33A thru 33D are located in each of the storage spaces 32A thru 32D, and in the first space 32A there is a water supply opening 34. Also, in the fourth space 32D there is a hot-water supply pipe 35, and this hot-water supply pipe 35 leads through the hot-water supply valve 36 to the central hollow section 37 in the aforementioned cylindrical container 30. Also, 20 is a pressure sensor, 21A and 21B are solenoid valves, 23 is a liquid-level sensor, and 24 is a temperature sensor.

38 is a pressure reduction valve, 39 is the hot-water drain, and 40 are the long thin ingredients, such as spaghetti, which are supplied from the hopper 7 and are to be processed. Also, 41 is the control section and is equipped with a microcomputer, and when it receives detection signals from each of the sensors, such as the pressure sensor 20, the liquid-level sensor 23, and the temperature sensor 24, it controls each of the heaters 33A thru 33D and the valves 36 and 38, and in so doing, automatically controls the flow of hot water from the heater 16 through the hot-water supply pipe 35 to the aforementioned central hollow section 37 which functions as the processing section. There are sensors in each of the spaces 32A thru 32D in the hot-water boiler 16, however they have been omitted from the drawing.

Next the operation of this embodiment will be described.

First, solenoid valve 21A is closed by the control section 41, and then solenoid valve 21B is closed causing the central hollow section 37 to be sealed. Next, the long thin ingredients 40 are supplied from the hopper 7. These ingredients are supported by solenoid 21A.

In this state, the water supplied to the first storage space 32A from the water supply opening 34 in the hot-water boiler 16 of FIG. 3 flows from one storage space to the next, it is heated by the heaters 33A thru 33D. After this, according to controls from the control section 41, the hot-water supply pipe 35 and hot-water supply valve 36 are opened and the high-pressure pump starts pumping.

In doing so, the water in the last storage space 32D of the hot-water boiler 16, which has already been heated to a high temperature, flows through the hot-water supply pipe 35 and hot-water supply valve 36 due to the pressure created from the high-pressure pump 19, and is supplied to and stored in the central hollow section 37. At this same time, the pressure reduction valve 38 functions, removing the air from inside the central hollow section 37.

Next, solenoid 21A is opened and the long thin ingredients 40, which were previously prepared, automatically drop into the central hollow section 37 and are cooked. After the ingredients have soaked for a desired length of time, for example 1 minute, solenoid valve 21B is opened and the cooked ingredients 40 drop into the tray 13. By pulling the tray drawer 13a forward, the processed ingredients can be removed. At this same time, the hot water is drained through drain 39. By repeating the above procedure, the long thin ingredients 40 can all be processed.

According to this embodiment, besides the effectiveness of the construction of the hot water boiler 16, to be described later, it is possible to heat the water to a temperature above 100° C., for example 130° C. to 150° C., due to the pressure created by the high-pressure pump 19, thus it is possible to process the long thin ingredients 40 in a shorter length of time than was done in prior cookers with a hot water temperature near 100° C. The temperature of the hot water is raised proportional to the increase of vapor pressure cause by the high-pressure pump.

FIG. 4 is a drawing explaining the movement of the hot water inside of the hot-water boiler 16. The water supplied to each of the storage spaces, 32A thru 32D is heated by the heaters, 33A thru 33D.

In this state, when a suitable amount of water is discharged through the hot-water supply pipe 35 from the fourth space 32D, an amount of water discharged is checked by the control section 41 and a comparable amount of new water is supplied to the first storage space 32A through the water supply opening 34. During the instant that this water flows into the space, the temperature of the hot water in the first storage space receives its effect and drops. At the same time, this also causes the temperature of the hot water in the second storage space 32B to drop, however it does not drop as much as in the first storage space 32A. The temperature of the hot water in the third storage space 32C also is affected and drops a little, however this drop in temperature is much less than that in the second storage space 32B. Finally, the hot water in the fourth storage space 32D is also affected a little, however the fourth storage space 32D is separated from he first storage space 32A and so the drop in temperature of the hot water can essentially be ignored.

According to this embodiment, the hot-water boiler is divided into several storage spaces, 32A thru 32D, by partitions, 31A thru 31D, and by putting a heater, 33A thru 33D, in each storage space, the water supplied to the first space 32A is heated and moves in order through each of the storage spaces and is then is discharged as hot water from the last storage space 32D. When the hot water from the last storage space 32D is supplied to the processing section, the new water equal to reduced amount water is supplied to the first storage space 32A however the temperature of the hot water in the last storage space 32D is not affected much, making it possible to always be able to automatically supply hot water at a constant temperature to the processing section.

There is no drop in temperature of the hot water while the ingredients are being cooked, as was the case in prior cookers, and so there is no wait time for supplying hot water to the processing section and the ingredients can be processed 20 more efficiently with no interruptions to the work. As an example, it was possible to reduce the processing time by 1/5 to 1/6 that of a prior cooker.

In this embodiment of the invention, an example was given where the hot-water boiler was divided into four storage spaces, however it is not limited to four, and the objectives of this invention can be accomplished with as few as two storage spaces. Also, this invention is not limited to a cylindrical shaped container but can be any shape which is divided into several spaces and is designed so that water flows from space to space.

According to the embodiment described above, each of the several storage spaces has a heater and is designed so that the supplied water flows from space to space, and when the water supplied to the first space is heated it moves on to the next space and finally the hot water is supplied to the processing section from the last space. This water, which is already hot is then raised to a high temperature, and is continuously and automatically supplied to the processing section at a constant temperature receiving no effects from the new water that is supplied to the first storage space, thus it is possible to improve the processing efficiency of the ingredients.

What is claimed is:

1. A single stage automatic noodle cooker comprising:
    a heating section having a water storage space and partitions for dividing said water storage space into multiple spaces wherein each of said multiple spaces includes a heater, wherein said heating section is designed so that water supplied to a first of said multiple spaces flows sequentially from space to space;
    a single stage processing section operatively connected to said heating section, by flow control means, to receive hot water which is discharged from said heating section, said processing section being adapted to receive ingredients to be cooked and further comprising outflow control means for controlling the outflow of cooked ingredients from said single stage processing section to immediately exit said automatic noodle cooker; and
    a control section operatively connected to said flow control means for control of the flow of hot water from said heating section to said processing section.

2. The automatic noodle cooker of claim 1 in which said heating section comprises a cylindrical container having a bottom, said multiple storage spaces are formed around the circumference of said cylindrical container, and said processing section is located in a central hollow section of said cylindrical container.

3. The automatic noodle cooker of claim 1, further comprising a high-pressure pump connected to said heating section, wherein when the ingredients which are to be cooked are supplied into said processing section, hot water is caused to flow to said processing section from said heating section when said control section controls the driving of said high-pressure pump.

4. The automatic noodle cooker of claim 1, further comprising:
    a liquid level sensor provided in said heating section and operatively connected to said control section, wherein said control section receives feedback from said liquid level sensor for use in controlling the flow of water supplied to said heating section.

5. The automatic noodle cooker of claim 1, further comprising:
    at least one temperature sensor provided in said heating section and operatively connected to said control section, wherein said control section controls at least one of said heaters according to feedback from said at least one temperature sensor.

6. The automatic noodle cooker of claim 5, further comprising:
    a temperature sensor provided in each of said multiple spaces of said heating section and operatively connected to said control section, wherein said control section controls each of said heaters according to feedback from each said corresponding temperature sensor.

7. The automatic noodle cooker of claim 1, wherein said processing section further comprises inflow control means for controlling the inflow of the ingredients to be cooked, to said processing section, wherein said control section controls opening and closing of said inflow and outflow control means.

8. The automatic noodle cooker of claim 1, wherein said control section comprises a microcomputer.

* * * * *

UNITED STATES PATENT AND TRADEMARK OFFICE
CERTIFICATE OF CORRECTION

PATENT NO. : 5,351,605

DATED : October 4, 1994

INVENTOR(S) : Keishu SAI et al.

It is certified that error appears in the above-indentified patent and that said Letters Patent is hereby corrected as shown below:

On the title page, item [57], line 22 of the Abstract, change "By" to ---by---.

At column 1, line 38, change "such a as" to ---such as---.
At column 1, line 64, change "increases-the" to ---increases the---.
At column 2, line 64, change "S" to ---3---.
At column 4, line 15, change "cause" to ---caused---.
At column 4, line 38, change "he" to ---the---.
At column 4, line 46, change "is then is" to ---is then---.
At column 4, line 60, delete "20".

Signed and Sealed this

Fifteenth Day of August, 1995

Attest:

BRUCE LEHMAN

Attesting Officer     Commissioner of Patents and Trademarks